US012123264B2

(12) United States Patent
Tripathy et al.

(10) Patent No.: US 12,123,264 B2
(45) Date of Patent: Oct. 22, 2024

(54) ADVANCED INSULATION AND JACKETING FOR DOWNHOLE POWER AND MOTOR LEAD CABLES

(71) Applicant: Baker Hughes Oilfield Operations LLC, Houston, TX (US)

(72) Inventors: Amiya Tripathy, Garnet Valley, PA (US); Dennis Matuszak, Broken Arrow, OK (US); David Livingston, Claremore, OK (US); Shawn Gunter, Owasso, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 235 days.

(21) Appl. No.: 17/524,627

(22) Filed: Nov. 11, 2021

(65) Prior Publication Data

US 2022/0148759 A1    May 12, 2022

Related U.S. Application Data

(60) Provisional application No. 63/112,588, filed on Nov. 11, 2020.

(51) Int. Cl.
*E21B 17/00*    (2006.01)
*E21B 17/02*    (2006.01)
(Continued)

(52) U.S. Cl.
CPC .......... *E21B 17/003* (2013.01); *E21B 17/023* (2013.01); *E21B 17/028* (2013.01);
(Continued)

(58) Field of Classification Search
CPC ........ H01B 7/046; H01B 7/282; H01B 7/292; H01B 7/0216; H01B 7/2806; H01B 3/002;
(Continued)

(56) References Cited

U.S. PATENT DOCUMENTS 3,663,742 A    5/1972 Hasebe et al.
4,343,660 A    8/1982 Martin
(Continued)

FOREIGN PATENT DOCUMENTS

CN    101770831 A    7/2010
EP    0369435 A2    5/1990
(Continued)

OTHER PUBLICATIONS

DuPont, "DuPont, ECCtreme ECA 3000 Fluoropolymer Resin Brochure", DuPont, ECCtreme ECA 3000 Fluoropolymer Resin Brochure, Copyright 2012, Jan. 1, 2012.
(Continued)

*Primary Examiner* — Peter J Bertheaud
(74) *Attorney, Agent, or Firm* — Crowe & Dunlevy, P.C.

(57) ABSTRACT

An electric submersible pumping system includes a motor, a pump driven by the motor, and a cable that provides electrical power to the motor. The cable includes a conductor and an insulator surrounding the conductor. The insulator includes a first layer surrounding the conductor and a second layer surrounding the first layer. The insulator may include an $H_2S$ scavenger and an $H_2S$ reactant in the first or second layers surrounding the conductor. The cable optionally includes a sub-insulator layer that includes a metal or nitride coating applied directly to the conductor.

19 Claims, 4 Drawing Sheets

(51) Int. Cl.

| | |
|---|---|
| *E21B 17/20* | (2006.01) |
| *E21B 43/12* | (2006.01) |
| *F04B 47/06* | (2006.01) |
| *F04D 13/06* | (2006.01) |
| *F04D 13/08* | (2006.01) |
| *F04D 13/10* | (2006.01) |
| *H01B 3/00* | (2006.01) |
| *H01B 7/02* | (2006.01) |
| *H01B 7/04* | (2006.01) |
| *H01B 7/28* | (2006.01) |
| *H01B 7/282* | (2006.01) |
| *H01B 7/29* | (2006.01) |
| *H02K 3/30* | (2006.01) |
| *H02K 3/34* | (2006.01) |
| *H02K 3/44* | (2006.01) |
| *H02K 5/132* | (2006.01) |
| *H02K 5/22* | (2006.01) |

(52) U.S. Cl.
CPC ........ *E21B 17/0285* (2020.05); *E21B 17/206* (2013.01); *E21B 43/128* (2013.01); *F04B 47/06* (2013.01); *F04D 13/0693* (2013.01); *F04D 13/08* (2013.01); *F04D 13/10* (2013.01); *H01B 7/0216* (2013.01); *H01B 7/046* (2013.01); *H01B 7/2806* (2013.01); *H01B 7/282* (2013.01); *H01B 7/292* (2013.01); *H02K 3/30* (2013.01); *H02K 3/34* (2013.01); *H02K 3/345* (2013.01); *H02K 3/44* (2013.01); *H02K 5/132* (2013.01); *H02K 5/225* (2013.01); *H01B 3/002* (2013.01); *H01B 7/0275* (2013.01); *H01B 7/0283* (2013.01)

(58) Field of Classification Search
CPC ... H01B 7/0275; H01B 7/0283; E21B 43/128; E21B 17/028; E21B 17/003; E21B 17/023; E21B 17/0285; E21B 17/206; H02K 5/132; H02K 3/30; H02K 3/44; H02K 5/225; H02K 3/34; H02K 3/345; F04D 13/10; F04D 13/0693; F04D 13/08; F04B 47/06
See application file for complete search history.

(56) References Cited

U.S. PATENT DOCUMENTS

| | | | |
|---|---|---|---|
| 4,521,485 A | 6/1985 | Tondre et al. | |
| 4,833,354 A | 5/1989 | Miller | |
| 4,985,313 A * | 1/1991 | Penneck | C23C 28/00 |
| | | | 428/629 |
| 5,319,269 A | 6/1994 | Bryant | |
| 5,521,009 A | 5/1996 | Ishikawa et al. | |
| 6,265,667 B1 * | 7/2001 | Stipes | H01B 7/28 |
| | | | 174/103 |
| 6,359,230 B1 * | 3/2002 | Hildreth | H01B 3/441 |
| | | | 174/120 C |
| 7,714,231 B2 | 5/2010 | Varkey et al. | |
| 8,726,980 B2 * | 5/2014 | Varkey | H01B 7/046 |
| | | | 166/66.4 |
| 9,040,828 B2 * | 5/2015 | Person | H01B 3/441 |
| | | | 174/120 SR |
| 2003/0215611 A1 | 11/2003 | Seth et al. | |
| 2006/0137898 A1 | 6/2006 | Kim et al. | |
| 2007/0074316 A1 | 3/2007 | Alden et al. | |
| 2008/0106157 A1 | 5/2008 | Higashimura et al. | |
| 2009/0301753 A1 | 12/2009 | Kikuchi et al. | |
| 2009/0317264 A1 | 12/2009 | Matarrita et al. | |
| 2010/0148623 A1 | 6/2010 | Liu | |
| 2011/0012473 A1 | 1/2011 | Parmeter et al. | |
| 2012/0034406 A1 | 2/2012 | Lahijani | |
| 2012/0063931 A1 | 3/2012 | Rumbaugh et al. | |
| 2013/0278117 A1 | 10/2013 | Parmeter et al. | |
| 2014/0127053 A1 | 5/2014 | Sheth et al. | |
| 2016/0217888 A1 * | 7/2016 | Xiang | H01B 13/06 |
| 2017/0365377 A1 | 12/2017 | Yun et al. | |
| 2018/0374613 A1 | 12/2018 | Zymelka | |
| 2019/0228879 A1 | 7/2019 | Yun et al. | |

FOREIGN PATENT DOCUMENTS

| | | |
|---|---|---|
| EP | 0930622 A1 | 7/1999 |
| EP | 1498909 A1 | 1/2005 |
| EP | 2557572 A1 | 2/2013 |
| GB | 2062360 A | 5/1981 |
| JP | 05314821 A | 11/1993 |
| WO | 03056575 A1 | 7/2003 |
| WO | 2012049508 A1 | 4/2012 |
| WO | 2014088900 A1 | 6/2014 |
| WO | 2014089430 A1 | 6/2014 |
| WO | 2016080956 A1 | 5/2016 |

OTHER PUBLICATIONS

DuPont, "DuPont, ECCtreme ECA 3000 Fluoropolymer Resin Brochure (2), Copyright 2012", DuPont, ECCtreme ECA 3000 Fluoropolymer Resin Brochure, Copyright 2012, Jan. 1, 2012.

Lahijani, Jacbo, et al., "A New Class of Perfluoropolymers: High Temperature Epitaxial Co-Crystalline (ECC) Polymer Resins", A New Class of Perfluoropolymers: High Temperature Epitaxial Co-Crystalline (ECC) Polymer Resins, Copyright 2011, Jan. 1, 2011.

UBE, "Upilex-VT Brochure", UBE; Upilex-VT Brochure (no date).

Victrex PLC, "Aptiv, Victrex PEEK Film Technology Brochure", Aptiv, Victrex PEEK Film Technology Brochure, Feb. 1, 2010.

International Search Report and Written Opinion for PCT/US2021/072358 mailed Mar. 2, 2022.

International Search Report and Written Opinion issued in connection with corresponding PCT Application No. PCT/US21/59015 dated May 6, 2022.

* cited by examiner

FIG. 9

ADVANCED INSULATION AND JACKETING FOR DOWNHOLE POWER AND MOTOR LEAD CABLES

RELATED APPLICATIONS

The present application claims the benefit of U.S. Provisional Patent Application Ser. No. 63/112,588 filed Nov. 11, 2020, entitled, "Advanced Insulation and Jacketing for Downhole Power and Motor Lead Cables," the disclosure of which is herein incorporated by reference.

FIELD OF THE INVENTION

The present invention relates generally to electric submersible pumping systems and more particularly to the insulation of electric conductors used in downhole electric submersible pumping systems.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

In many applications, power is conducted from the power cable to the motor via a "motor lead cable." The motor lead cable typically includes one or more "leads" that are configured for connection to a mating receptacle on the motor. The leads from the motor lead cable are often retained within a motor-connector that is commonly referred to as a "pothead." The pothead relieves the stress or strain realized between the motor and the leads from the motor lead cable. Motor lead cable is often constructed in a "flat" configuration for use in the limited space between downhole equipment and the well casing.

Because the power and motor lead cables are positioned in the annulus between the production string and well casing, these cables must be designed to withstand the inhospitable downhole environment. Prior art cables often fail over time as corrosive well fluids degrade the various layers of insulation placed around the electrical conductors. Without sufficient insulation, the high-capacity power and motor lead cables become susceptible to electrical malfunctions that cause irreparable damage to the cable and downhole equipment.

Power and motor lead cables typically include a conductor, insulation surrounding the conductor, a lead jacket encasing the insulator, and a durable external armor that surrounds the jacket. Although covered by several layers of protection, the insulation remains a common source of failure in power and motor lead cables. In the past, manufacturers have used EPDM rubber, polypropylene or polyethylene as the dielectric insulation layer that surrounds the conductive material.

In certain applications, the presence of hydrogen sulfide ($H_2S$) in the wellbore can accelerate corrosion and other attacks on the conductor (carcass) of the cable. In the past, extruded lead has been used as a barrier to protect the copper conductor from $H_2S$ attack. Lead can be toxic to humans and animals and carries certain health and safety concerns. Additionally, lead is heavy and increases the costs associated with manufacturing, packaging, shipping, and handling. Furthermore, lead is a soft metal that can be mechanically damaged, which may compromise its ability to provide a barrier function. Accordingly, there is a need for an improved cable design for use in power and motor lead cables that provides adequate resistance from $H_2S$ and other corrosive compounds in downhole environments. It is to these and other deficiencies in the prior art that exemplary embodiments of the present invention are directed.

SUMMARY OF THE INVENTION

In one aspect, embodiments of the present invention include an electric submersible pumping system configured for operation in downhole applications. The electric submersible pumping system includes a motor, a pump driven by the motor, and a cable that provides electrical power to the motor. The cable includes a conductor and an insulator surrounding the conductor. The insulator includes a first layer surrounding the conductor and a second layer surrounding the first layer. The second layer comprises an $H_2S$ scavenger. The first layer may also include an $H_2S$ reactant.

In another aspect, embodiments of the present invention include an electric submersible pumping system configured for operation in downhole applications. The electric submersible pumping system includes a motor, a pump driven by the motor, and a cable that provides electrical power to the motor. The cable includes a conductor and an insulator surrounding the conductor. The insulator includes a first layer and a second layer surrounding the first layer. The cable further includes a sub-insulator layer between the conductor and the insulator. The sub-insulator layer comprises a coating applied directly to the conductor. In some embodiments, the coating is a metal coating. In other embodiments, the coating is a nitride coating.

In another aspect, the present disclosure is directed to a cable for use in an electric submersible pumping system configured for operation in downhole applications. The cable has a conductor, an insulator surrounding the conductor, and a sub-insulator layer between the insulator and the conductor. The insulator includes a first layer and a second layer surrounding the first layer. The insulator has an $H_2S$ scavenger in the first or second layer of the insulator and an $H_2S$ reactant in the first or second layer of the insulator. The sub-insulator layer is applied directly to the conductor and may include metal and nitride-based coatings.

WRITTEN DESCRIPTION

Figure 1:
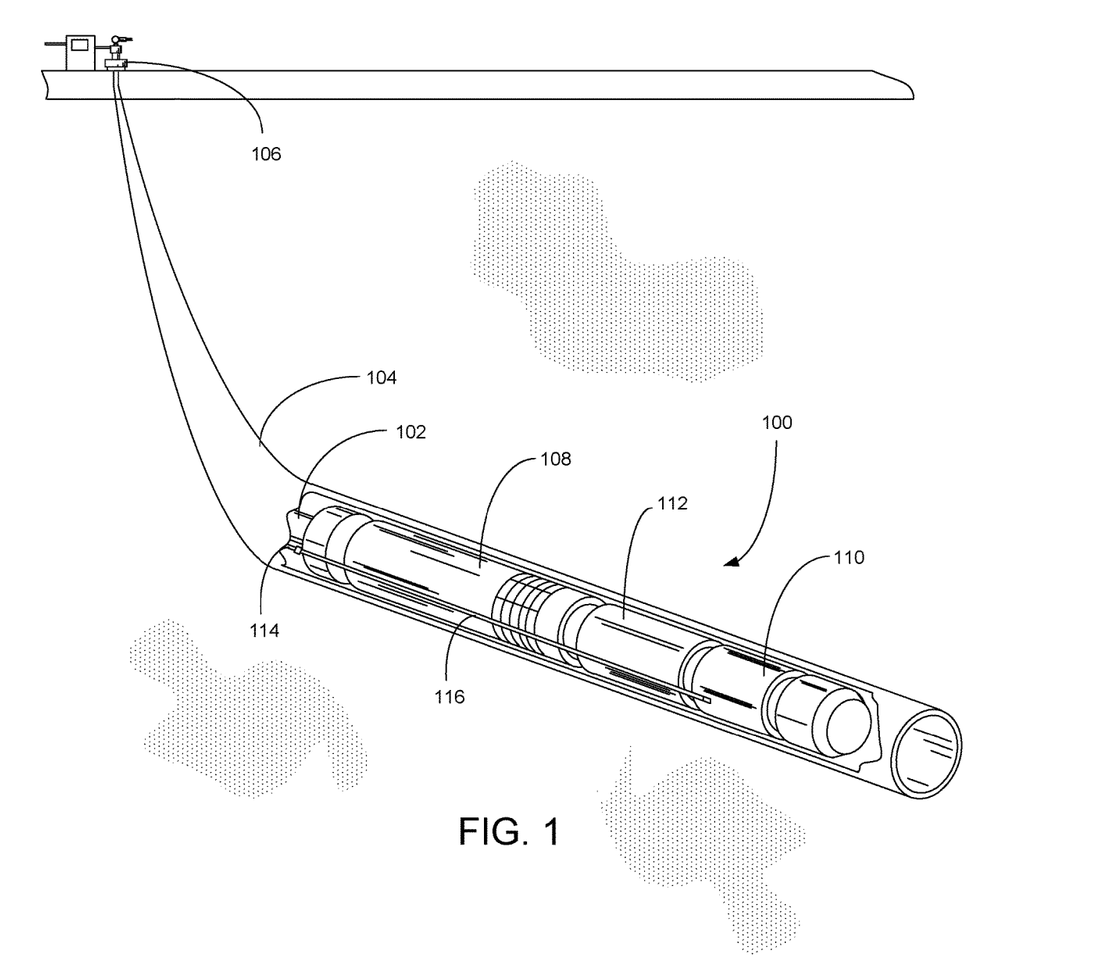
FIG. 1 is a back view of a downhole pumping system constructed in accordance with an embodiment of the present invention.

In accordance with an exemplary embodiment of the present invention, FIG. 1 shows a front perspective view of a downhole pumping system 100 attached to production tubing 102. The downhole pumping system 100 and production tubing 102 are disposed in a wellbore 104, which is drilled to produce a fluid such as water or petroleum. The downhole pumping system 100 is shown in a non-vertical well. This type of well is often referred to as a "horizontal" well. Although the downhole pumping system 100 is depicted in a horizontal well, it will be appreciated that the downhole pumping system 100 can also be used in vertical wells.

As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations. It will be further understood that the pumping system 100 is well-suited for use in high-temperature applications, including steam-assisted gravity drainage (SAGD) and geothermal applications, where downhole temperatures may exceed 250° C., or where the concentration of hydrogen sulfide ($H_2S$) gas is high.

The pumping system 100 includes a pump 108, a motor 110 and a seal section 112. The motor 110 is an electric motor that receives its power from a surface-based supply through a power cable 114 and motor lead cable 116. In many embodiments, the power cable 114 and motor lead cable 116 are each configured to supply the motor 110 with three-phase power from a surface-based variable speed (or variable frequency) drive 118. As used herein, the generic reference to "cable" refers to both the power cable 114 and the motor lead cable 116.

The motor 110 converts the electrical energy into mechanical energy, which is transmitted to the pump 108 by one or more shafts. The pump 108 then transfers a portion of this mechanical energy to fluids within the wellbore, causing the wellbore fluids to move through the production tubing 102 to the surface. In some embodiments, the pump 108 is a turbomachine that uses one or more impellers and diffusers to convert mechanical energy into pressure head. In other embodiments, the pump 108 is a progressive cavity (PC) or positive displacement pump that moves wellbore fluids with one or more screws or pistons.

The seal section 112 shields the motor 110 from mechanical thrust produced by the pump 108. The seal section 112 is also configured to prevent the introduction of contaminants from the wellbore 104 into the motor 110. Although only one pump 108, seal section 112 and motor 110 are shown, it will be understood that the downhole pumping system 100 could include additional pumps 108, seal sections 112 or motors 110.

Figure 2:
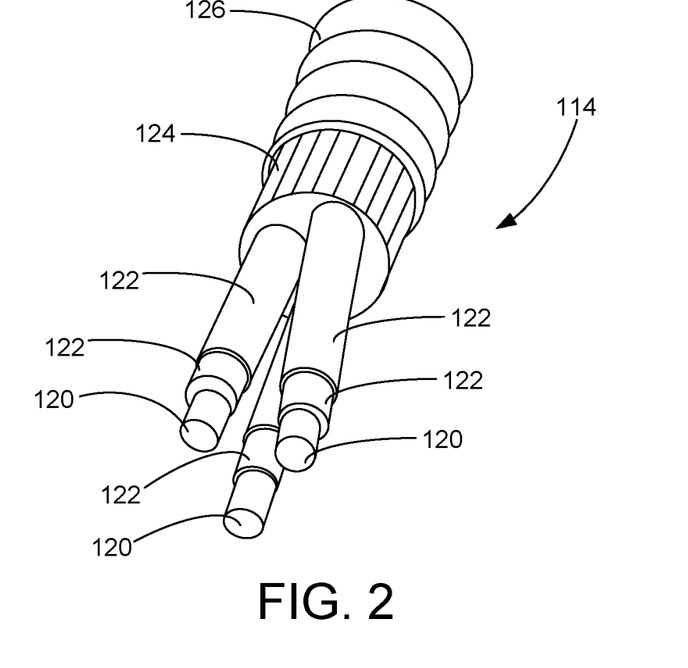
FIG. 2 is a perspective view of the power cable of the downhole pumping system of FIG. 1.
Figure 3:
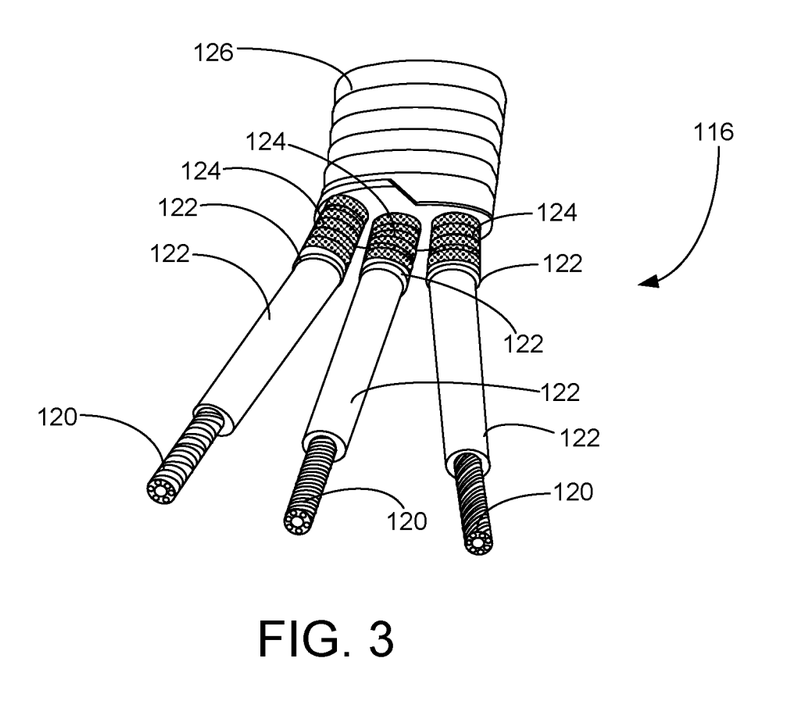
FIG. 3 is a perspective view of the motor lead cable of the downhole pumping system of FIG. 1.

Referring now to FIGS. 2 and 3, shown therein are perspective views of a round power cable 114 and a flat motor lead cable 116, respectively. It will be understood that the geometric configuration of the power cable 114 and motor lead cable 116 can be selected on an application specific basis. Generally, flat cable configurations, as shown in FIG. 3, are used in applications where there is a limited amount of annular space around the pumping system 100 in the wellbore 104. In the exemplary embodiments depicted in FIGS. 2 and 3, the power cable 114 and motor lead cable 116 each include one or more conductors 120, one or more insulators 122, a jacket 124 and external armor 126.

In exemplary embodiments, the conductors 120 are manufactured from copper and may include a solid core (as shown in FIG. 2), a stranded core, or a stranded exterior surrounding a solid core (as shown in FIG. 3). The jacket 124 is protected from external contact by the armor 126. The armor 126 can be manufactured from galvanized steel, stainless steel, Monel or other suitable metal or composite material.

Figure 4:
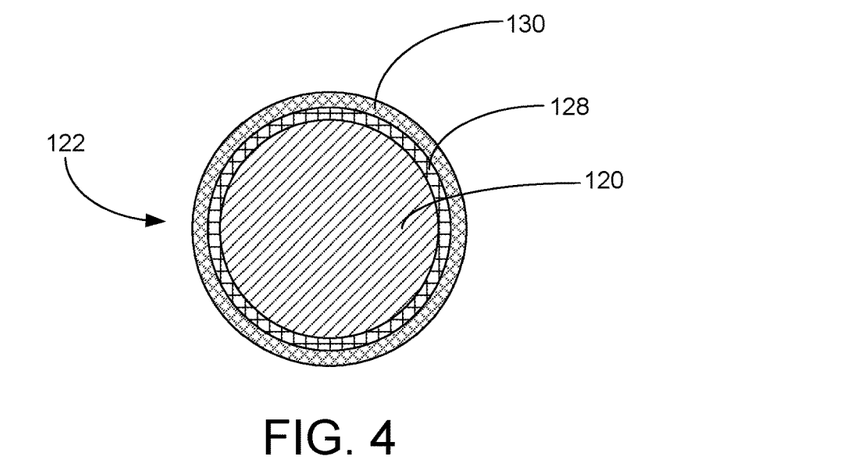
FIG. 4 is a cross-sectional view of the conductor and two-layer insulator of one or both of the power cable and motor lead cable of FIG. 1.
Figure 5:
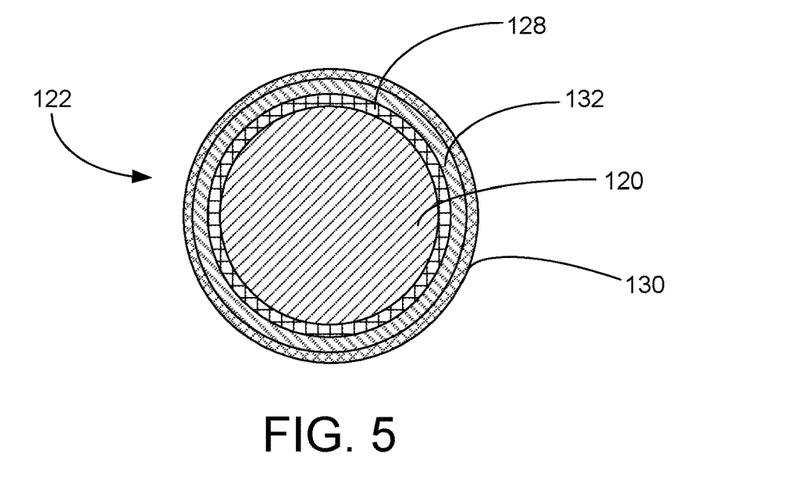
FIG. 5 is a cross-sectional view of the conductor and three-layer insulator of one or both of the power cable and motor lead cable of FIG. 1.
Figure 6:
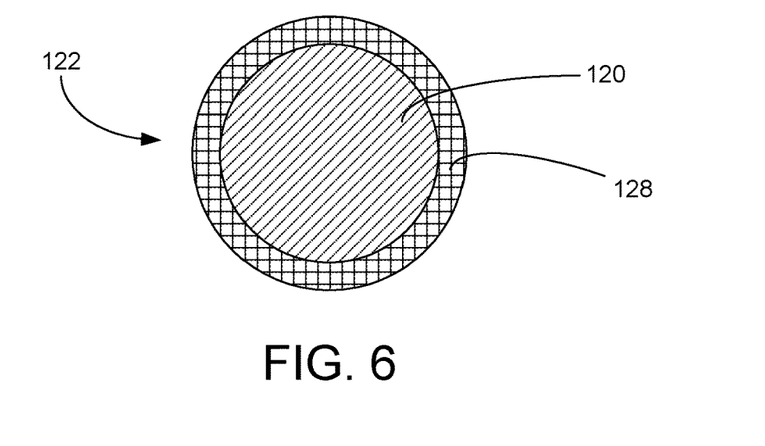
FIG. 6 is a cross-sectional view of the conductor and one-layer insulator of one or both of the power cable and motor lead cable of FIG. 1.

The insulators 122 are configured to electrically isolate the conductors 120, while providing increased resistance to $H_2S$ and other corrosive or oxidative compounds potentially present in the wellbore 104. Turning to FIGS. 4-6, shown therein are cross-sectional views of various embodiments of the conductor 120 and insulator 122. In the embodiment depicted in FIG. 4, the insulator 122 includes an interior first layer 128 and an exterior second layer 130. In the embodiment depicted in FIG. 5, the insulator includes an intermediate third layer 132 in addition to the first and second layers 128, 130. In the embodiment depicted in FIG. 6, the insulator 122 includes only the first layer 128. It will be appreciated that the jacket 124 and armor 126 have been removed from the cross-sectional depictions in FIGS. 4-6. As explained below, various embodiments include improved insulators 122 that improve the resistance of the cables 114, 116 to attack by $H_2S$ and other corrosive compounds.

In a first embodiment, the insulator 122 includes a polymer-based reactive barrier configured to neutralize or mitigate $H_2S$ and $CO_2$ to prevent contamination or corrosion of the conductor 120. In this first embodiment, the insulator 122 includes at least two layers of insulation. The first (inner) layer 128 is a polymer layer that has been compounded with an $H_2S$ reactant. Suitable $H_2S$ reactive compounds (reactants) include zinc oxide (ZnO), ferric oxide ($Fe_2O_3$), and zirconium oxide ($ZrO_2$). Suitable polymers include EPDM, PP/EPDM, fluoroplastics, including PEEK, PEKK, PAEK, polyimide, PFA, PTFE, PSU, cross-linked fluoropolymers, and other high-temperature polymers. Upon contact with $H_2S$, the $H_2S$ reactive compounds within the first layer 128 convert the $H_2S$ to metallic sulfide, which acts as an inert, non-corrosive filler on the conductor 120, within the first layer 128 or between the conductor 120 and the first layer 128.

The second (outer) layer 130 includes a polymer layer that has been compounded with $H_2S$ scavengers. Suitable polymers include EPDM, PP/EPDM, fluoroplastics, including PEEK, PEKK, PAEK, polyimide, PFA, PTFE, PSU, cross-linked fluoropolymers, and other high-temperature polymers. Suitable $H_2S$ scavengers include triazines, ammonium-bisulphite, ferrous gluconate, zinc, lead oxide, tin oxide, iron oxide, and zirconium oxide. In some embodiments, the $H_2S$ scavengers include the sodium salts of triazoles, which can be water soluble and incorporated into a polymer matrix. Suitable sodium salts of triazoles include benzotriazole, tolyltriazole, tetrahydrobenzotriazole, and butylbenzotriazole. The $H_2S$ scavengers are optionally configured to provide a delayed release from the high-temperature polymer selected for the second layer 130. The extended, controlled release of the $H_2S$ scavenger will prolong the life of the conductor 120. If $H_2S$ passes through the $H_2S$ scavenger layer, the remaining $H_2S$ is converted to metallic sulfide by the $H_2S$ reactive layer, as discussed above.

It will be appreciated that the same chemicals can be used for both the $H_2S$ reactants and $H_2S$ scavengers. In some embodiments, the $H_2S$ reactants and $H_2S$ scavengers. Suitable formulations for one or both of the first layer 128 and the second layer 130 include, but are not limited to, the following formulations (expressed on a "by weight" percentage):

| Mix # | PFA | Zinc Oxide | Iron Oxide | Zirconium Oxide |
|---|---|---|---|---|
| 1 | 80% | 20% | 0% | 0% |
| 2 | 90% | 10% | 0% | 0% |
| 3 | 80% | 0% | 20% | 0% |
| 4 | 85% | 0% | 0% | 15% |
| 5 | 90% | 0% | 10% | 0% |

Thus, in this first embodiment, the insulator 122 includes an outer polymer layer 130 that includes one or more $H_2S$ scavenger components, and an inner polymer layer 128 that includes one or more $H_2S$ reactive components. It will be appreciated that the first and second layers 128, 130 can each constitute multiple extruded layers, multiple layers of film arranged in cross-ply or stacked configurations, or combinations of extruded and wrapped layers. The use of cross-ply wrapped layers may increase the mechanical strength of the power or motor lead cable 114, 116. The use of multiple barrier layers within insulator 122 with $H_2S$ scavengers and $H_2S$ reactants presents a cost-effective and safer alternative to the conventional use of lead-based insulation.

In a second embodiment, the insulator 122 includes multiple layers of inert and reactive polymers that provide electrical insulation and chemical resistance for the conductor 120. The first (inner) layer 128 is manufactured from a polyarylether ketone (PAEK) polymer. The first layer 128 can be between about 0.1 mm and 2.0 mm in thickness. A thickness of the first layer 128 of about 0.9 mm works well for several embodiments. Suitable polymers for the first layer 128 include polyether ether ketone (PEEK) polymers and polyether ketone ketone (PEKK) polymers, which are widely available from a variety of sources.

The insulator 122 includes a second (outer) layer 130 manufactured from a polymer that has been compounded with $H_2S$ scavengers. Suitable polymers include perfluoroalkoxy polymer (PFA) and suitable $H_2S$ scavengers include triazines, ammonium-bisulphite, ferrous gluconate, and other $H_2S$ scavengers disclosed herein. The $H_2S$ scavengers are optionally configured to provide a delayed release from the high-temperature polymer selected for the second layer 130. The extended, controlled release of the $H_2S$ scavenger will prolong the life of the conductor 120. The second (outer) layer 130 can have a thickness of about 0.5 mm to about 2.0 mm. A second layer 130 with a thickness of about 1.0 mm works well for many embodiments of the insulator 122.

The insulator 122 includes a third (intermediate) layer 132 that is manufactured from a chemically inert polymer. The third layer 132 can be manufactured from a fluoroplastic polymer and can have a thickness of between about 0.5 mm and about 2.0 mm. A third layer 132 with a thickness of about 0.8 mm works well for many embodiments of the insulator 122. Suitable polymers for the second layer 130 include commercially available PFA polymers, which are then treated with zinc oxides either by compounding (impregnation) or layered coating processing.

Thus, in this second embodiment, the insulator 122 includes an inner layer, an intermediate layer, and an outer layer that has been compounded with one or more $H_2S$ scavengers to mitigate the impact of sour gas and other corrosive downhole chemicals.

In a third embodiment, the insulator 122 includes a combination of polymer layers that defends the conductor 120 against attack from corrosive chemicals like $H_2S$, $CO_2$, water, and methane. In this embodiment, the first layer 128 is manufactured from polyether ether ketone (PEEK) polymer. The second layer 130 is manufactured from an extruded layer of high-temperature crystallized fluoroplastics. In some embodiments, the second insulation layer 130 is manufactured from a perfluoropolymer resin that undergoes a positive melt point shift upon crystallization.

The second layer 130 provides favorable electrical insulating properties, chemical resistance properties and resistance to permeation by methane, oxygen, and carbon dioxide gases at temperatures around about 300° C. Suitable perfluoropolymers are available from a variety of sources.

In a fourth embodiment, the jacket 124 is manufactured from zinc or zinc alloys. The use of a zinc-based jacket 124 presents a significant advantage over traditional lead-based jackets and sheathes, which are heavy and present health and safety concerns during manufacture and handling. The zinc-based jacket 124 can be used in combination with any of the embodiments of the insulator 122 disclosed above.

Figure 7:
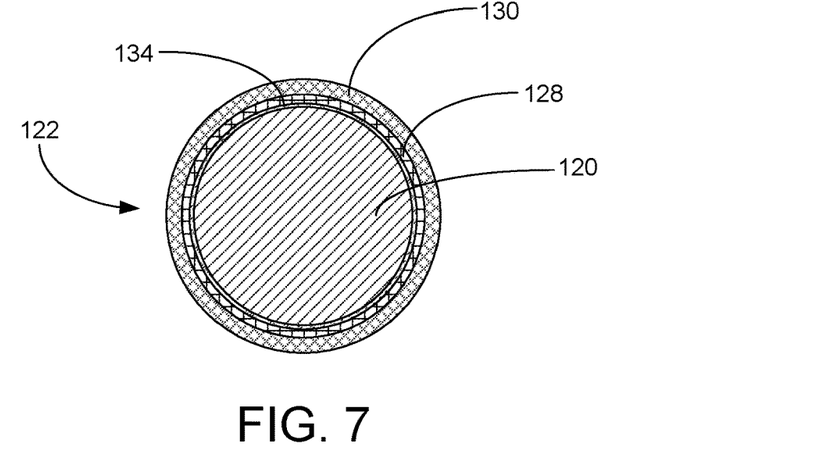
FIG. 7 is a cross-sectional view of an embodiment in which a sub-insulator layer is located between the conductor and a two-layer insulator.
Figure 8:
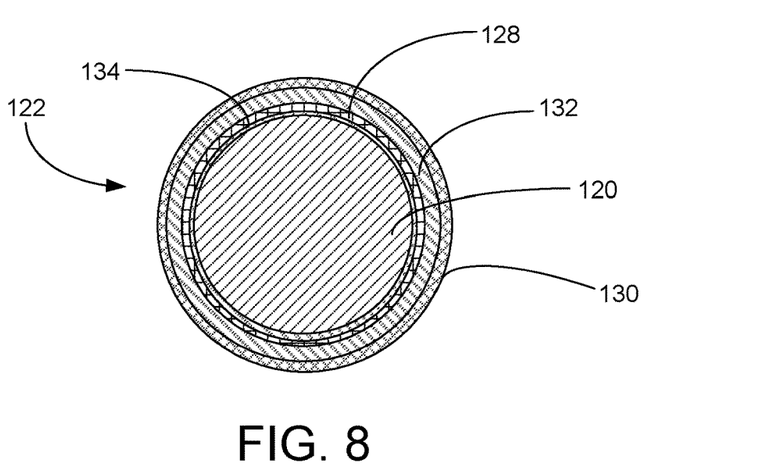
FIG. 8 is a cross-sectional view of an embodiment in which a sub-insulator layer is located between the conductor and a three-layer insulator.
Figure 9:
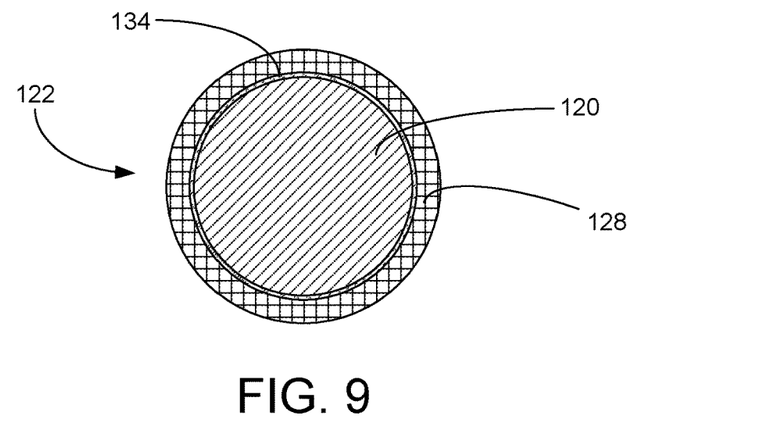
FIG. 9 is a cross-sectional view of an embodiment in which a sub-insulator layer is located between the conductor and a one-layer insulator.

Turning to FIGS. 7-9, shown therein are cross-sectional views of additional embodiments in which an additional sub-insulator layer 134 has been placed over the conductor 120 and beneath the insulator 122. The sub-insulator layer 134 (or "fourth layer 134") is located between the metal conductor 120 and the first layer 128. It will be appreciated that the sub-insulator layer 134 is not shown to scale in FIGS. 7-9.

In one embodiment, the sub-insulator layer 134 is formed by electroplating the copper conductor 120 with a substantially continuous metal coating. In other embodiments, the sub-insulator layer 134 is produced by wrapping metal tape, foil or cladding around the copper conductor 120. In each case, the sub-insulator layer 134 is formed from a corrosion-resistant material. Suitable metals for the sub-insulator layer 134 include tin, tin/nickel alloys, tin/lead alloys, tin/indium alloys, silver, aluminum, tungsten, molybdenum, tantalum, Inconel, and other nickel-chromium based alloys.

In other embodiments, the sub-insulator layer 134 is prepared by coating the conductor 120 with a nitride compound, such as boron nitride, carbon nitride, aluminum nitride, tin nitride, and silicon nitride. The additional sub-insulator layer 134 will further mitigate corrosion and breakdown caused by an interaction between wellbore contaminants (like $H_2S$) and the copper conductor 120.

Several embodiments have been disclosed for improving the construction of power cables 114 and motor lead cables 116. Although various features have been disclosed as independent embodiments, it will be understood that features from different embodiments can be used together in new combinations. For example, the various first, second and third layers 128, 130, 132 of the insulator 122 can be interchanged between embodiments, such that the prescribed first layer 128 from one embodiment can be used in concert with the second layer 130 from another embodiment. The optional sub-insulator layer 134 can be incorporated into any of the embodiments disclosed herein to further improve the corrosion resistance of the power cables 114 and motor lead cables 116.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An electric submersible pumping system configured for operation in downhole applications, the electric submersible pumping system comprising:
   a motor;
   a pump driven by the motor; and
   a cable that provides electrical power to the motor, wherein the cable comprises:
      a conductor; and
      an insulator surrounding the conductor, wherein the insulator comprises:
         a first layer;
         a second layer surrounding the first layer;
         an $H_2S$ scavenger within the first layer or the second layer of the insulator; and
         an $H_2S$ reactant or mixture of reactants within the first layer or the second layer of the insulator; and
      a sub-insulator layer between the conductor and the insulator.

2. The electric submersible pump of claim 1, wherein the $H_2S$ scavenger is selected from the group consisting of triazines, sodium salts of triazoles, ammonium-bisulphite, and ferrous gluconate.

3. The electric submersible pump of claim 2, wherein the $H_2S$ scavenger is selected from the group of sodium salts of triazoles consisting of benzotriazole, tolyltriazole, tetrahydrobenzotriazole, and butylbenzotriazole.

4. The electric submersible pump of claim 1, wherein the first layer is manufactured from a fluoroplastic.

5. The electric submersible pump of claim 4, wherein the first layer is manufactured from a fluoroplastic selected from the group consisting of PEEK, PEKK, PAEK, polyimide-based fluoropolymers, PFA, PTFE, and cross-linked fluoropolymers.

6. The electric submersible pump of claim 1, wherein the $H_2S$ reactant is selected from the group consisting of zinc oxide (ZnO), ferric oxide ($Fe_2O_3$) and zirconium oxide ($ZrO_2$).

7. The electric submersible pump of claim 1, wherein the insulator comprises a third layer disposed between the first and second layers.

8. The electric submersible pump of claim 7, wherein the third layer is manufactured from perfluoroalkyl (PFA) polymer.

9. The electric submersible pump of claim 1, wherein the sub-insulator layer comprises a metal coating applied directly to the conductor.

10. The electric submersible pump of claim 9, wherein the metal coating comprises a metal or metal alloy selected from the group consisting of tin, tin/nickel alloys, tin/lead alloys, tin/indium alloys, silver, aluminum, tungsten, molybdenum, tantalum, and nickel/chromium alloys.

11. The electric submersible pump of claim 1, wherein the sub-insulator layer comprises a nitride coating applied directly to the conductor.

12. The electric submersible pump of claim 11, wherein the nitride coating is selected from the group consisting of boron nitride, carbon nitride, aluminum nitride, tin nitride, and silicon nitride.

13. An electric submersible pumping system configured for operation in downhole applications, the electric submersible pumping system comprising:
    a motor;
    a pump driven by the motor; and
    a cable that provides electrical power to the motor, wherein the cable comprises:
       a conductor; and
       an insulator surrounding the conductor, wherein the insulator comprises:
          a first layer;
          a second layer surrounding the first layer;
          an $H_2S$ scavenger within the first layer or the second layer of the insulator; and
          an $H_2S$ reactant within the first layer or the second layer of the insulator; and
       a sub-insulator layer between the conductor and the insulator, wherein the sub-insulator layer comprises a coating applied directly to the conductor and wherein the coating is selected from the group consisting of metal coatings and nitride coatings.

14. The electric submersible pump of claim 13, wherein the first layer is manufactured from a polyaryl ether ketone polymer (PAEK).

15. The electric submersible pump of claim 14, wherein the first layer is manufactured from a polyether ether ketone (PEEK) polymer.

16. The electric submersible pump of claim 15, wherein the first layer is manufactured from a polyether ketone ketone (PEKK) polymer.

17. A cable for use in an electric submersible pumping system configured for operation in downhole applications, the cable comprising:
    a conductor;
    an insulator surrounding the conductor, wherein the insulator comprises:
       a first layer;
       a second layer surrounding the first layer;
       wherein the insulator comprises an $H_2S$ scavenger in the first or second layer of the insulator; and
       wherein the insulator comprises an $H_2S$ reactant in the first or second layer of the insulator; and a sub-insulator layer between the conductor and the insulator.

18. The cable of claim 17, wherein the sub-insulator layer comprises a metal coating on the conductor, wherein the metal coating comprises a metal or metal alloy selected from the group consisting of tin, tin/nickel alloys, tin/lead alloys, tin/indium alloys, silver, aluminum, tungsten, molybdenum, tantalum, and nickel/chromium alloys.

19. The cable of claim 17, wherein the sub-insulator layer comprises a nitride coating on the conductor, wherein the nitride coating is selected from the group consisting of boron nitride, carbon nitride, aluminum nitride, tin nitride, and silicon nitride.

\* \* \* \* \*